(12) United States Patent
Faber et al.

(10) Patent No.: US 8,730,652 B2
(45) Date of Patent: May 20, 2014

(54) OPTIMALLY SHAPED BUS CONNECTOR

(75) Inventors: Timothy R. Faber, Marion, IA (US); Benjamin Pulido, North Liberty, IA (US); Daniel G. Hollinger, Cedar Rapids, IA (US)

(73) Assignee: Schneider Electric USA, Inc., Palatine, IL (US)

( * ) Notice: Subject to any disclaimer, the term of this patent is extended or adjusted under 35 U.S.C. 154(b) by 342 days.

(21) Appl. No.: 13/155,974

(22) Filed: Jun. 8, 2011

(65) Prior Publication Data

US 2012/0314340 A1  Dec. 13, 2012

(51) Int. Cl.
*H02B 1/20* (2006.01)

(52) U.S. Cl.
USPC ........... 361/638; 361/611; 361/624; 361/637; 174/72 B (58) Field of Classification Search
USPC ......... 361/605, 611, 619, 624, 634, 637–639, 361/673
See application file for complete search history.

(56) References Cited

U.S. PATENT DOCUMENTS

| | | | |
|---|---|---|---|
| 1,978,246 A * | 10/1934 | Bauerschmidt | 200/255 |
| 3,663,773 A | 5/1972 | Powell | |
| 3,806,768 A | 4/1974 | Gryctko et al. | |
| 4,025,747 A * | 5/1977 | Bharteey et al. | 200/254 |
| 4,033,660 A * | 7/1977 | Ericson et al. | 439/262 |
| 4,205,207 A | 5/1980 | Clausing | |
| 4,241,975 A | 12/1980 | Cooper, Jr. | |
| 4,447,858 A | 5/1984 | Farag et al. | |
| 4,531,174 A * | 7/1985 | Rickmann | 361/609 |
| 4,565,908 A | 1/1986 | Bould | |
| 4,814,942 A | 3/1989 | Robirds et al. | |
| 5,036,427 A | 7/1991 | Krom et al. | |
| 5,477,017 A | 12/1995 | Swindler et al. | |
| 6,066,814 A | 5/2000 | Smith et al. | |
| 6,242,702 B1 | 6/2001 | Spiegel et al. | |
| 6,603,075 B1 * | 8/2003 | Soares et al. | 174/72 B |
| 6,680,842 B1 * | 1/2004 | Pelaez et al. | 361/631 |
| 6,777,627 B1 | 8/2004 | Stevenson | |
| 7,286,340 B2 * | 10/2007 | Karim et al. | 361/647 |
| 7,646,271 B2 | 1/2010 | Gottschalk et al. | |
| 7,786,384 B2 | 8/2010 | Diaz | |
| 7,825,344 B2 | 11/2010 | Stevenson | |

FOREIGN PATENT DOCUMENTS

| | | |
|---|---|---|
| EP | 0926793 A1 | 6/1999 |
| EP | 1914769 A2 | 4/2008 |
| EP | 2110826 A1 | 10/2009 |
| WO | WO2010/077594 | 8/2010 |

OTHER PUBLICATIONS

"Cluster Retention Kits for Masterpact® NW Circuit Breakers"; Schneider Electric Instruction Bulletin No. 48049-897-05; 8 pages; May 2008.

(Continued)

*Primary Examiner* — Courtney Smith
(74) *Attorney, Agent, or Firm* — Locke Lord LLP (57) ABSTRACT

Power connectors and switchgear assemblies are presented herein. A power connector is disclosed for electrically coupling a circuit breaker to an electrically conductive bus bar. The connector includes a fork-shaped head for electrically connecting to the circuit breaker, and a base for electrically connecting to the bus bar. A yoke extends between and connects the base to the fork-shaped head. The yoke has a transverse cross-section with a length that is greater than a width. The length and/or width of the transverse cross-section varies between respective ends of the transverse cross-section.

19 Claims, 11 Drawing Sheets

(56) References Cited

OTHER PUBLICATIONS

"Low Voltage Switchgear" EATON Powering Business Worldwide; 2 pages, Apr. 19, 2011.
"Power Break™ II" GE Energy Industrial Solutions, 2 pages, Apr. 19, 2011.
"WL Lowe Voltage Switchgear" @Siemens; 1 page, Apr. 19, 2011.

"Air Circuit Breakers-Emax" ABB Power Breakers-Circuit Breakers (Low Voltage Products and Systems) 2 pages, Apr. 19, 2011.
International Search Report corresponding to co-pending International Patent Application Serial No. PCT/US2012/039968, European Patent Office, dated Aug. 7, 2012; (5 pages).
International Written Opinion corresponding to co-pending International Patent Application Serial No. PCT/US2012/039968, European Patent Office, dated Aug. 7, 2012; (6 pages).

* cited by examiner

OPTIMALLY SHAPED BUS CONNECTOR

TECHNICAL FIELD

The present disclosure relates generally to power distribution devices and systems, and more particularly to bus connectors for connecting circuit breakers to power bus bars.

BACKGROUND

Circuit breakers are most commonly used to protect electrical equipment from overload and short circuit events. Large circuit breakers that carry thousands of amps of current are oftentimes installed into metal-enclosed switchgear assemblies, which are also referred to as "switchboards." Switchgears have large electrical conductors called bus bars (or "buss bars") that carry current from a power source, such as a power utility, through the circuit breakers, to loads that are protected by the circuit breaker. These large circuit breakers, which can weigh hundreds of pounds, are typically lifted into the switchgear and racked by mounting the circuit breakers into a drawout cradle. A manually controlled or remotely operated mechanism is inserted into the cradle to turn a crank that racks the circuit breaker into the switchgear and completes an electrical circuit which is protected by the breaker.

On the backs of these large circuit breakers facing the rear interior of the switchgear cabinet are connection members, such as bus bars, with pivots (also known as "cluster supports") that jut out like rails on a train track. Onto these pivots are installed multiple "clusters," which are electrical connectors that have opposing stacks of plate-like fingers. These fingers straddle the pivots and allow the clusters to adapt their positions to engage bus bar connectors, such as fixed stab terminals ("stabs") or turnable joint mount (TJM) connectors, which are housed inside the switchgear cabinets during the blind rack-in connection. These fingers are biased by spring elements to stay on the pivots so that the cluster "snaps" onto the pivot. It is important that these clusters remain secured on the pivots because if they become loose or dislodged as the circuit breaker is being racked into the switchgear or during operation of the switchgear, a cross-phase connection or a short circuit from an electrical phase to ground can occur.

The switchgear assembly typically comprises a cabinet that houses a drawout circuit breaker cradle for receiving and supporting the circuit breaker. The drawout cradle simplifies mounting and dismounting of the circuit breaker from field serviceable connections, allowing for ease of installation, removal, and maintenance. At the distal end of the cabinet is a breaker backmold, which is often made from a rigid thermoset material, such as a phenolic resin, and used as a mounting interface. For instance, the backmold attaches to the circuit breaker cradle and provides a mounting surface for current transformers, metering transformers, and the power connectors (e.g., stabs or TJMs). The power connectors are typically designed to engage the circuit breaker clusters, field serviceable connections, and current and metering transformers.

Contemporary TJM power connectors are solid metallic structures with a rectangular base attached via an intermediate yoke to a two-prong forked head, all of which are integrally formed from hot-extrusion metal-working processes. The yoke, which connects the base to the head of the connector, has a solid square-shaped cross-section and operates to carry electrical current from the bus bar to one or more breaker clusters. Current TJM connectors are not designed to provide optimal current density distribution (e.g., electric current per unit area of cross section) when in operation. Current TJM connector designs also fail to mitigate the proximity effect caused by adjacent current-carrying structures. Moreover, existing TJM connectors are not designed to reduce skin effect or maximize thermal convective cooling.

SUMMARY

Through the use of multi-physics-based analytical tools, aspects of this disclosure are directed to power connector designs that take into consideration the proximity effect, the skin effect, the current density distribution, and thermal convection theories. This analytical approach, combined with improved metal casting processes, allows for the realization of connector geometries that are better optimized in terms of heat generation, e.g., via joule heating, heat dissipation, e.g., via conduction, convection, and radiation, mechanical strength, material, and weight. The various designs disclosed herein are applicable, in some embodiments, to turnable joint mount (TJM) connectors.

An advantage of embodiments of the present disclosure includes a reduced amount of material required to make each bus connector, without reducing the current carrying capacity or structural integrity of the bus connector. A significant reduction in material, as well as increased convective heat transfer and reduced proximity effect and skin effect, is realized by optimizing the cross-sectional geometry of the yoke and, in some embodiments, by removing material from the center of the yoke. These advantages are obtained while maintaining the structural integrity of the connector, including the robustness needed to withstand the forces that are present during product installation and a high current electrical interruption.

According to some aspects of the present disclosure, a power connector is presented for connecting a circuit breaker to an electrically conductive bus bar. The power connector includes a fork-shaped head that is configured to electrically connect to the circuit breaker, and a base that is configured to electrically connect to the bus bar. A yoke extends between and electrically connects the base to the fork-shaped head. The yoke has a transverse cross-section with a length that is greater than a width. The length or width, or both, vary between respective ends of the transverse cross-section.

According to other aspects of the present disclosure, a power connector is presented for electrically coupling a circuit breaker to an electrically conductive power bus bar of a switchgear assembly. In a non-limiting example, the power connector can be of the TJM connector type. This power connector includes a fork-shaped head with two or more prongs, each of which is configured to receive thereon and electrically connect to one or more breaker clusters protruding from the circuit breaker. The power connector also includes a base that is configured to mount to the switchgear assembly and electrically connect to the bus bar. A yoke extends between and is integrally formed with the base and the fork-shaped head. The yoke has a transverse cross-section with an elongated geometry—i.e., its length is greater than its width. The cross-section is transverse in that it is substantially perpendicular to a centrally located major axis of the power connector. The length and width decrease from the center towards respective ends of the transverse cross-section.

According to additional aspects of the present disclosure, a switchgear assembly is featured for electrically coupling a circuit breaker to an electrically conductive power bus bar. The switch gear assembly includes a housing, a backmold, and an electrical connector. The housing is designed to receive therein the circuit breaker. The backmold is operatively attached at a distal end of the housing. The electrical connector includes a metallic monolithic body with a fork-shaped head, a base and a yoke. The fork-shaped head electrically connects to the circuit breaker. The base mounts to the backmold and electrically connects to the bus bar. The yoke, which extends between the base and the fork-shaped head, has a transverse cross-section with a length and a width. The transverse cross-section is substantially perpendicular to a major axis of the electrical connector. The length and the width of the cross-section vary between respective ends of the transverse cross-section.

The foregoing summary is not intended to represent each embodiment or every aspect of the present disclosure. Rather, the foregoing summary merely provides an exemplification of some of the novel features and aspects included herein. The above features and advantages, and other features and advantages of the present disclosure, will be readily apparent from the following detailed description of the embodiments and best modes for carrying out the present invention when taken in connection with the accompanying drawings and appended claims.

While the present disclosure is susceptible to various modifications and alternative forms, specific embodiments have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of the invention as defined by the appended claims.

DETAILED DESCRIPTION

Figure 1:
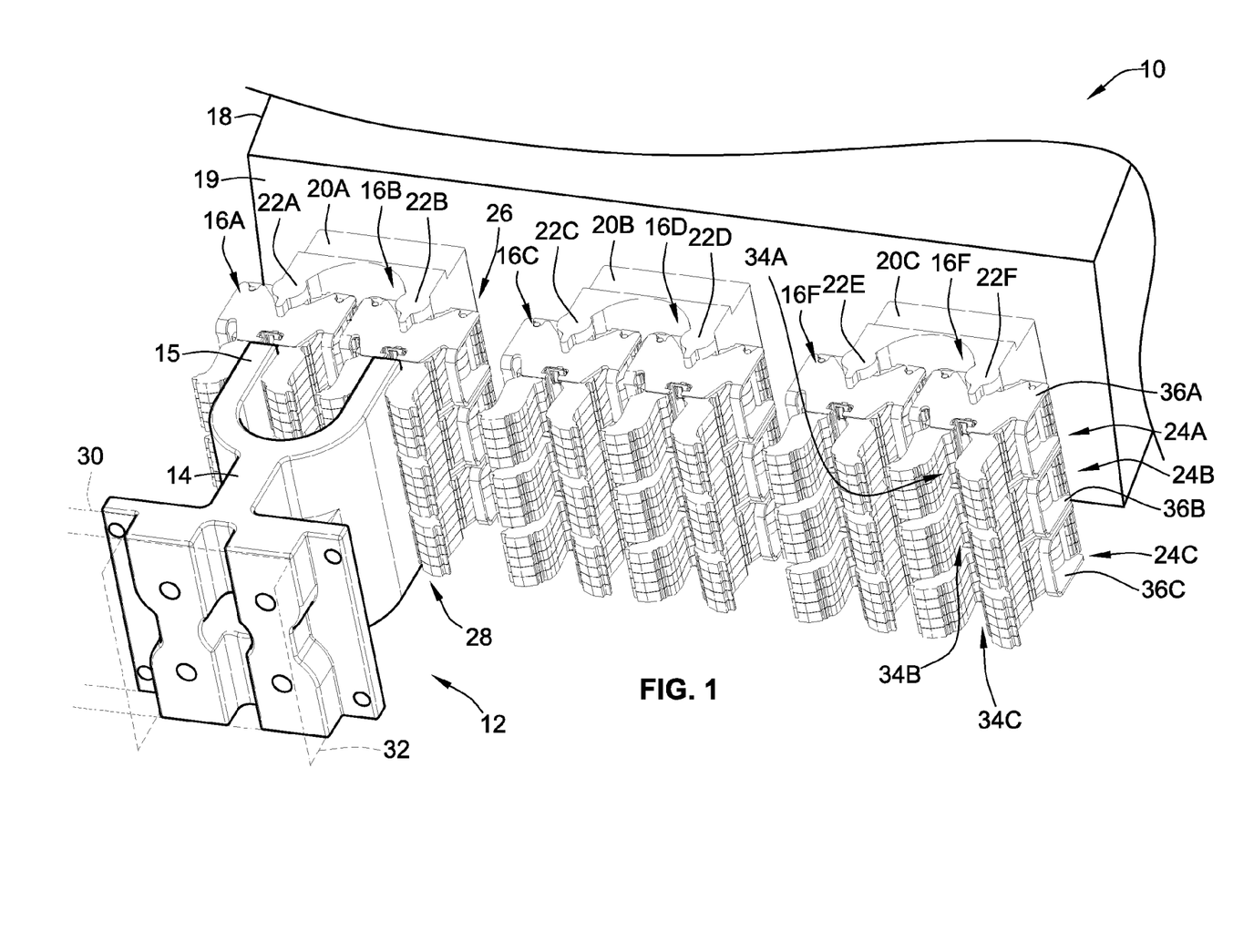
FIG. 1 is a perspective-view illustration of a representative circuit breaker assembly electrically coupled to a representative switchgear assembly in accordance with aspects of the present disclosure.

Referring now to the drawings, wherein like reference numbers refer to like components throughout the several views, FIG. 1 is a perspective-view illustration of a representative circuit breaker assembly, illustrated schematically at 10. The circuit breaker assembly 10 may be of the "draw-out type" circuit breaker. In some non-limiting examples, a suitable circuit breaker assembly 10 can be based on the exemplary draw-out type circuit breakers disclosed, for example, in U.S. Pat. No. 5,036,427, to Thomas J. Krom et al., or U.S. Pat. No. 4,531,174, to Bernard C. Rickmann. In this regard, the circuit breaker assembly 10 can be conventionally mounted for movement into and out of a representative switchgear assembly, which is designated generally at 12 in FIG. 1, for connection to an electrically conductive power bus bar. A representative racking device for racking draw-out type circuit breakers into a switchgear cell is disclosed, for example, in U.S. Pat. No. 5,477,017, to David L. Swindler et al. The switchgear assembly 12 can comprise a convention cabinet (also referred to herein as "enclosure" or "housing"), which is generally represented in the drawings by a rigid backmold (illustrated schematically at 30) and a turnable joint coupling (illustrated schematically at 32), which can be electrically connected to a power bus bar (not visible in the view provided). Additional information regarding switchgear assemblies can be found in U.S. Pat. No. 6,242,702, to Jacob B. Spiegel et al. While the illustrated embodiment is shown as a switchboard apparatus, it should be understood that the aspects of the present disclosure could be embodied in other types of electrical apparatuses including, without limitation, motor controllers and other load controllers.

In the illustrated embodiment, the circuit breaker assembly 10 is electrically coupled to the switchgear assembly 12 via one or more electrically conductive power connectors 14, which can be of the turnable joint mount (TJM) connector type, as explained in further detail below. Although only one power connector 14 is shown in FIG. 1, it should be readily understood that the switchgear assembly 12 will typically include a number of similarly oriented power connectors 14. When properly connected, the breaker 10 can be operable to distribute power from a primary power source, such as a standard utility power source, to a load. The circuit breaker assembly 10 includes, for example, a housing 18 with a rearward facing wall 19. Three substantially identical cluster supports 20A-C are fixed to the rearward facing wall 19 of the circuit breaker housing 18. Integrally formed with each cluster support 20A-C exemplified in FIG. 1 is a pair of laterally spaced, spade-shaped pivots 22A-F. The pivots 22A-F are vertically elongated rails that project generally orthogonally from the rearward facing wall 19 of the circuit breaker housing 18. It should be understood that the drawings are not necessarily to scale and are provided purely for descriptive purposes; thus, the individual and relative dimensions and orientations presented herein are not to be considered limiting. To that end, the circuit breaker 10 can include greater or fewer than three cluster supports 20A-C of similar or differing structure to that shown in the drawings.

In FIG. 1, the circuit breaker 10 is electrically coupled to each power connector 14 by one or more columns 16A-F (two in FIG. 1) of self-locking "cluster-type" breaker connectors 24A-C. Each column 16A-F includes three substantially identical breaker clusters 24A-C (i.e., 18 total breaker connectors in the illustrated embodiment) that are vertically stacked one on top of the other. Each breaker cluster 24A-C has a first ("breaker-side") end portion, designated generally as 26 in FIG. 1, opposing a second ("bus-side") end portion, designated generally as 28. The first end portions 26 are designed to attach to (e.g., seat on and straddle) one of the spade-shaped pivots 22A-F of the cluster supports 20A-C. The second end portions 28, in contrast, are designed to electrically mate with (e.g., interference-fit and clamp onto an arm 15) one of the power connectors 14. Each breaker cluster 24A-C includes a cage 36A-C and a finger cluster 34A-C. The finger clusters 34A-C generally include a pair of opposing stacks of electrically conductive, elongated plates (also known as "fingers"). The cages 36A-C generally act as a functional sleeve or casing, extending generally continuously around the outer perimeter of a respective cluster 34A-C to thereby operatively maintain the fingers in their stacks. Although shown interfacing with six breaker clusters 24A-C, the power connector 14 can be configured to mate with fewer or greater than six breaker clusters 24A-C, each of which may be similar or different in design to the breaker clusters shown in the drawings. For example, the power connector 14 can be configured to mate with one or more of the breaker cluster designs presented in commonly owned, copending U.S. patent application Ser. No. 13/013,275, to Timothy R. Faber et al., which was filed on Jan. 25, 2011.

FIGS. 2A-2D illustrate an exemplary power connector, indicated generally at 114, in accordance with aspects of the present disclosure. According to this illustrated embodiment, the power connector 114 comprises three primary segments: a fork-shaped head 116, a base 118, and a yoke 120. In general, the yoke 120 extends between and electrically connects the base 118 to the fork-shaped head 116. In the illustrated embodiments, for example, the yoke 120 originates at and projects from the surface of the base 118 that is opposite the surface which contacts the backmold 30; the yoke 120 terminating at and connecting to the web 126 of the fork-shaped head 116. The head 116, the base 118, and the yoke 120 can be integrally formed as a single-piece, monolithic structure. In contrast to conventional practices, it is preferred in some aspects of this disclosure that the power connector 114 be formed via casting or molding. In so doing, the power connectors disclosed herein can take on additional features and complex 3-dimensional designs that would otherwise be impractical or even impossible through traditional extrusion processes used for fabricating prior art power connectors. It is desirable, in some embodiments, that the power connector 114 be fabricated from a highly electrically conductive material, such as copper or aluminum.

Figure 2A:
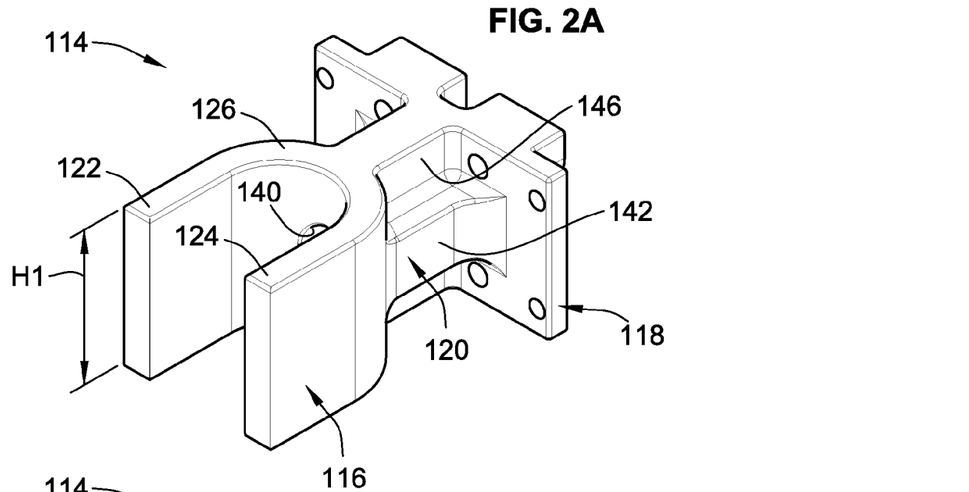
FIG. 2A is a perspective-view illustration of an exemplary cruciform power connector in accordance with aspects of the present disclosure.
Figure 2B:
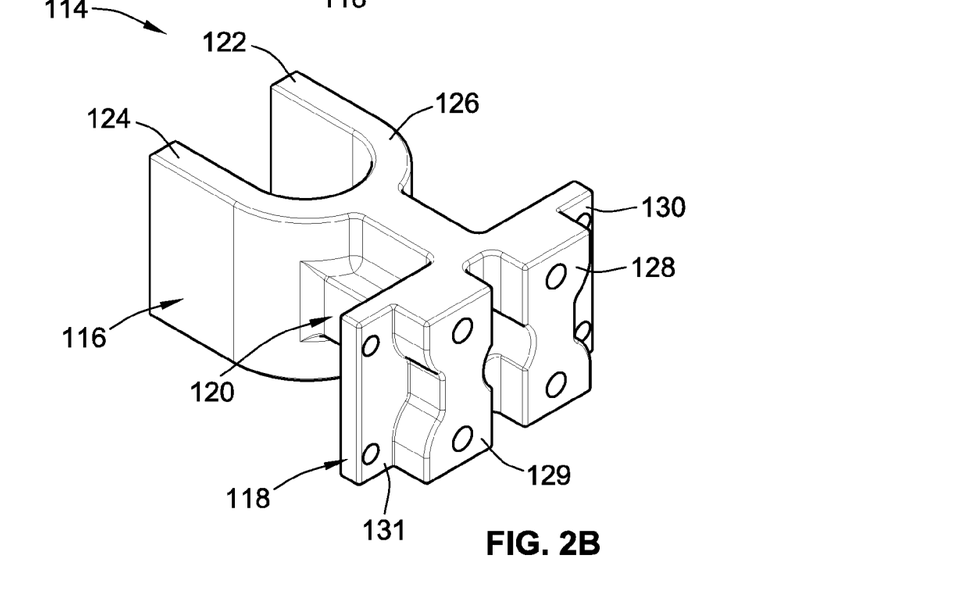
FIG. 2B is an alternative perspective-view illustration of the exemplary power connector of FIG. 2A.
Figure 2C:
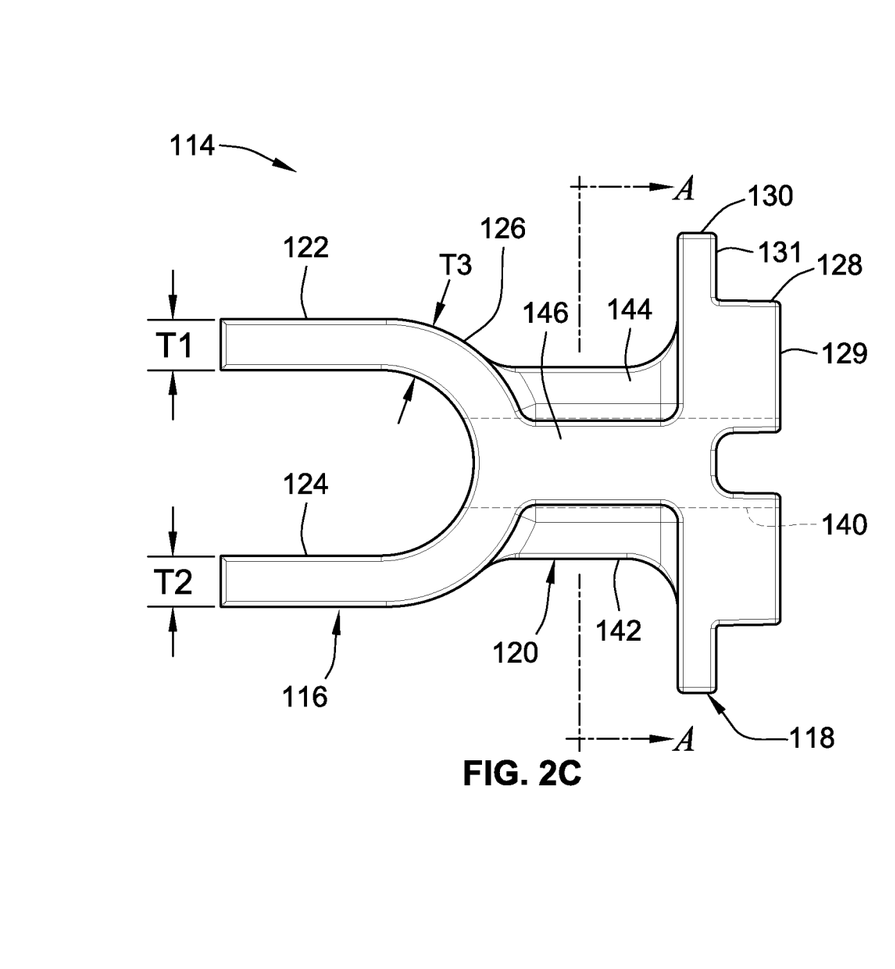
FIG. 2C is a plan-view illustration of the exemplary power connector of FIG. 2A.

The fork-shaped head 116 is, generally speaking, configured to electrically connect the power connector 114 to an electrical component, such as the circuit breaker assembly 10 of FIG. 1. The fork-shaped head 116 illustrated in FIGS. 2A-2C, for example, comprises two generally flat, blunt-ended prongs (also known as "tines" or "arms") 122 and 124 that are connected via an intermediate web 126. The interconnected prongs 122, 124 and web 126 collectively define a generally symmetrical U-shaped plan-profile, as best seen in FIG. 2C. The first and second prongs 122, 124 have first and second thicknesses T1 and T2, respectively, while the web 126 has a third thickness T3. According to some aspects of the present disclosure, the web 126 and two prongs 122, 124 have a generally uniform thickness—i.e., the first, second and third thicknesses T1-T3 are approximately equal to one another.

Each prong 122, 124 can be designed to receive thereon and thereby operatively connect to one or more breaker clusters, such as the cluster-type breaker connectors 24A-C of FIG. 1. By way of non-limiting example, when the circuit breaker assembly 10 is fed into the switchgear assembly 12, for example, via a draw-out rack, the fingers 34A-C of one or more breaker clusters 24A-C press onto and straddle a respective prong 122, 124. In this manner, an interference-fit is created between the cluster 24A-C and the fork-shaped head 116 of the power connector 114. This allows for electrical current to pass between the circuit breaker 10 and the power connector 114 through the breaker clusters 24A-C. It should be recognized that the size and shape of the head 116 generally, or each prong 122, 124 specifically, can be varied, for example, depending upon the intended application of the power connector 114.

The base 118, generally speaking, is configured to mount the power connector 114 to a mounting surface, such as a complementary segment of the switchgear assembly 12 of FIG. 1, and operatively couple the power connector 114 to an electrical circuit, which may be to a bus bar by way of the turnable joint coupling 32 of FIG. 1. In the illustrated embodiment, for example, the base 118 is generally symmetrical and tiered, with a contoured platform 128 that projects generally orthogonally from a generally rectangular stratum 130, as best seen in FIG. 2B. In some embodiments, the base 118 can be said to have a "split base" configuration with a keyed (or non-regular) raised platform 128. It should be recognized that the size and shape of the base 118 can be varied from what is shown in the drawings without departing from the scope and spirit of the present disclosure. The platform 128 has a first mounting surface 129 that is generally parallel to and spaced (e.g., longitudinally offset) from a second mounting surface 131 of the stratum 130. The first mounting surface 129 is configured, e.g., via first mounting holes 132 (FIG. 2D), to operatively couple to a bus bar, for example, via turnable joint coupling 32 of FIG. 1. In comparison, the second mounting surface 131 is configured, e.g., via second mounting holes 134 (FIG. 2D), to attach to a mounting surface, such as the backmold 30 of switchgear assembly 12.

Figure 2D:
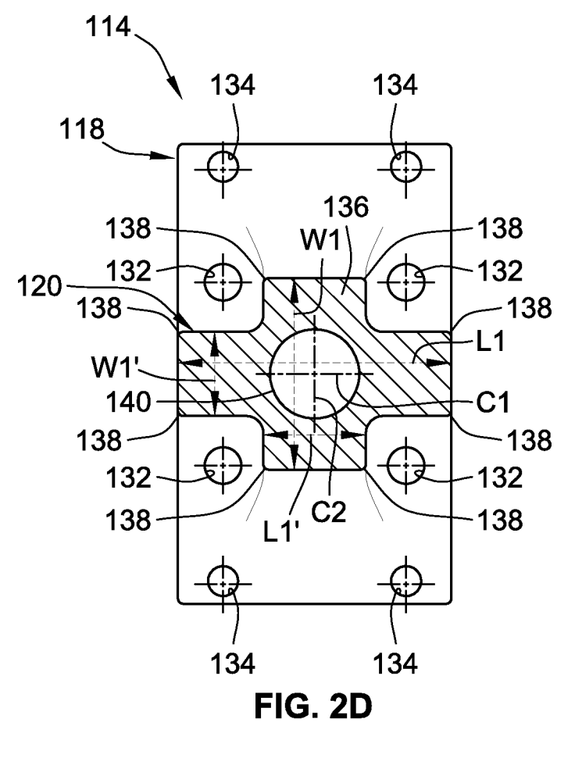
FIG. 2D is an end-view illustration of the exemplary power connector of FIG. 2A, which is taken in partial cross-section along line A-A of FIG. 2C.

The yoke 120, in general, electrically and mechanically couples the head 116 to the base 118. FIG. 2D shows that the yoke 120 has an transverse cross-section, designated generally at 136, with an elongated geometry, i.e., having a length L1 that is greater than a width W1. By way of clarification, and not limitation, the cross-section 136 is a transverse cross-section in that it is generally perpendicular to the longitudinal center axis of the power connector 114, which is represented by the center of the crosshair provided in FIG. 2D. The transverse cross-section 136 of FIGS. 2A-2D has a cruciform shape comprising two laterally extending ribs 142 and 144, each of which projects generally perpendicularly from a respective opposing side of a column 146. The longitudinal center axis can be the major axis (i.e., the axis with the greatest distance between antipodal points) of the power connector 114. An optional borehole 140 extends longitudinally through the power connector 114 from the base 116, through the yoke 120, and out the fork-shaped head 118. Unlike some conventional connectors, the yoke 120 of the power connector 114 can have a complex 3-dimensional geometry. In some embodiments of the present disclosure, for example, the geometric configuration of the yoke 120 changes in all three planes of a Cartesian coordinate system.

In contrast to prior designs, the length L1 of the transverse cross-section 136 of the yoke 120 in FIGS. 2A-2D is not constant along its width W1, and the width W1 of the transverse cross-section 136 is not constant along its length L1. For instance, the length designated L1' is shorter that L1 whose arrow points touch the respective ends of that dimension in FIG. 2D. Likewise, for example, the width designated W1' is shorter that the width designated W1 whose arrow points touch the respective ends of that dimension in FIG. 2D. According to the illustrated embodiment, the length L1 decreases, for example, to L1' as you move from the longitudinally oriented center line C1 of FIG. 2D toward either respective lateral end (or side) of the transverse cross-section 136. In a similar regard, the width W1 of the transverse cross-section 136 decreases, for example, to W1' as you move from the laterally oriented center line C2 of FIG. 2D toward either respective longitudinal end (or side) of the transverse cross-section 136. Thus, the length L1 or the width W1, or both as illustrated herein, are varying between their respective ends of the transverse cross-section. In addition, the outer periphery of the transverse cross-section 136 of the yoke 120 includes a plurality of round-chamfered corners 138 (eight in the illustrated embodiment).

An advantage of the embodiment presented in FIGS. 2A-2D includes a reduced amount of material required to make each power connector 114, while maintaining the requisite current carrying capacity (e.g., 1600-2000 A at 60 Hz) and structural integrity (e.g., mechanical and electrical loads of 1500 kg and 320 ka, respectively) for normal operation thereof. This significant reduction in material is realized by optimizing the cross-sectional geometry of the yoke 120 and via inclusion of the borehole 140. These advantages are achieved while maintaining the structural integrity of the power connector 114, including the robustness needed to withstand the forces that are present during product installation and a high current electrical interruption.

Through the use of mathematical modeling and analytical tools, these optimized geometries are designed while taking into consideration the proximity effect, the skin effect, and thermal convection theories. The phenomenon known as "skin effect" holds that the current density near the surface of the conductor is greater than at its core. The skin effect, in other words, is the tendency of an alternating electric current (AC) to distribute itself within a conductor with the current density being largest near the surface of the conductor, decreasing at greater depths. The skin effect causes the effective resistance of the conductor to increase at higher frequencies where the skin depth is smaller, thus reducing the effective cross-section of the conductor. Moreover, in multi-phase systems, adjacent connectors are subjected to another undesirable phenomenon called the "proximity effect," which relates to how current flowing through one phase affects the current flowing through an adjacent phase. In a conductor carrying alternating current, if currents are flowing through one or more other nearby conductors, such as within adjacent TJM connectors, the distribution of current within the first conductor will be constrained to smaller regions due to alternating magnetic fields in the adjacent conductors. The resulting current crowding is termed the "proximity effect." The yoke 120 design presented herein significantly reduces both the skin effect and the proximity effect when compared to its conventional connector counterparts. In some embodiments, the yoke 120 has a current density when electricity flows therethrough, the current density being more generally uniformly distributed across the transverse cross-section 136 of the yoke 120 than what is available in comparable conventional designs.

Figure 3A:
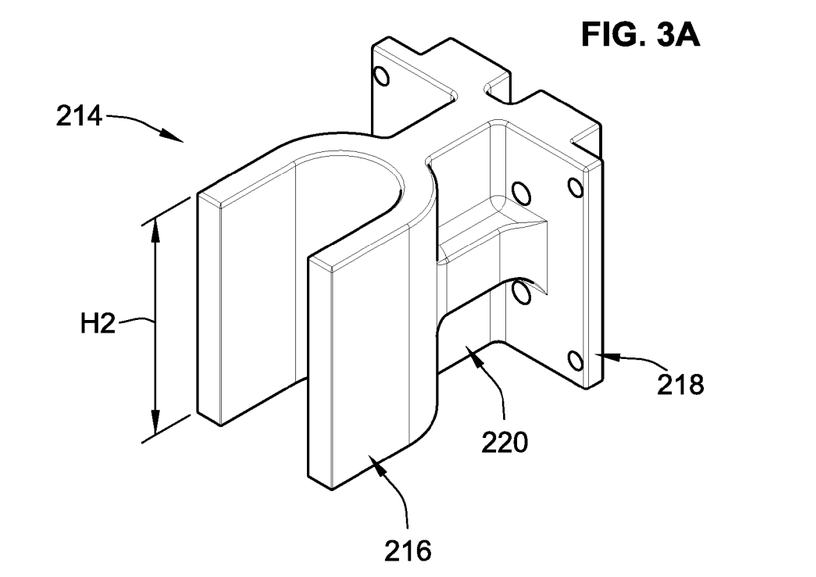
FIG. 3A is a perspective-view illustration of another exemplary cruciform power connector in accordance with aspects of the present disclosure.
Figure 3B:
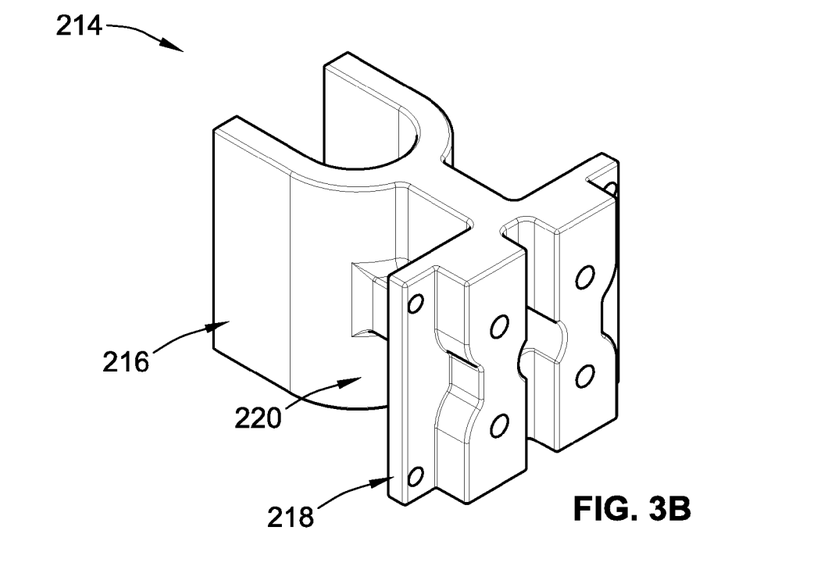
FIG. 3B is an alternative perspective-view illustration of the exemplary power connector of FIG. 3A.

Turning next to FIGS. 3A and 3B, wherein similar reference numerals refer to similar components from the other drawings, another exemplary power connector, indicated generally at 214, is presented in accordance with aspects of the present disclosure. Like the power connector 114 embodied in FIGS. 1A-1D, the power connector 214 comprises three primary segments: a fork-shaped head 216, a base 218, and a yoke 220. In the embodiment illustrated in FIGS. 3A and 3B, the head 216, base 218, and yoke 220 are structurally and functionally similar to the head 116, base 118, and yoke 120 of FIGS. 2A-2D. For instance, the yoke 220 extends between and electrically and mechanically connects the base 218 to the fork-shaped head 216. In addition, the head 216 is configured to electrically connect the power connector 214 to an electrical component, such as the circuit breaker assembly 10 of FIG. 1. As another example of similarity, the base 218 is configured to mount the power connector 214 to a mounting surface, such as a complementary segment of the switchgear assembly 12 of FIG. 1, and operatively couple the power connector 214 to an electrical circuit, which may be by way of a power bus bar. In yet another example, the yoke 220 has a transverse cross-section with an elongated cruciform shape comprising two mutually perpendicular overlapping rectangular segments. The yoke 220 can be optimized similar to the yoke 120 to increase thermal dissipativity, reduce the skin effect, the proximity effect, and connector material, while maintaining the requisite current carrying capacity and structural integrity. Therefore, for efficiency and conciseness, these components will not be described again in detail. A primary difference between the power connector 214 of FIGS. 3A and 3B and the power connector 114 presented in FIGS. 2A-2D is the overall size and weight of the connector 214. In particular, the power connector 214 has a larger height H2 than the height H1 of the power connector 114. As such, the power connector 214 also has a larger electrical and mechanical load carrying capacity.

Figure 4A:
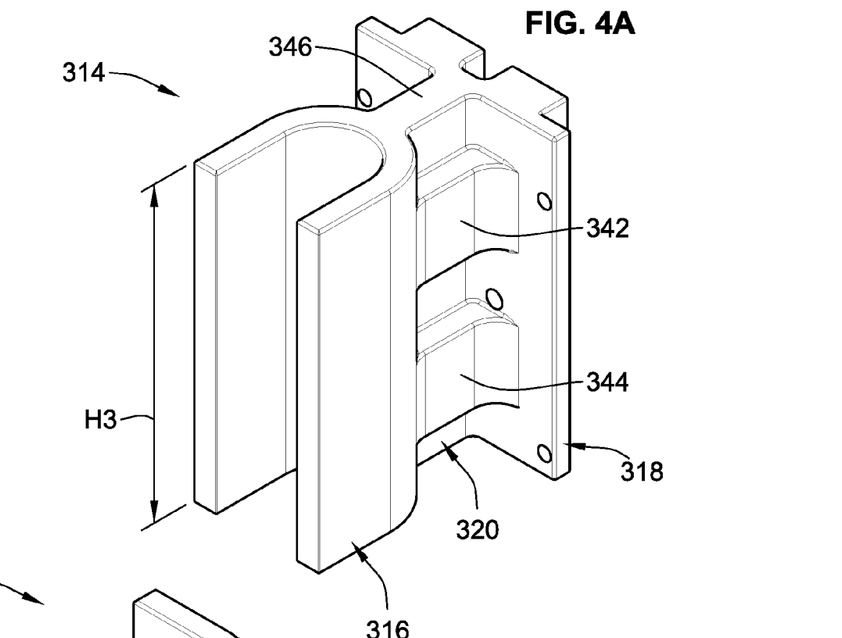
FIG. 4A is a perspective-view illustration of yet another exemplary cruciform power connector in accordance with aspects of the present disclosure.
Figure 4B:
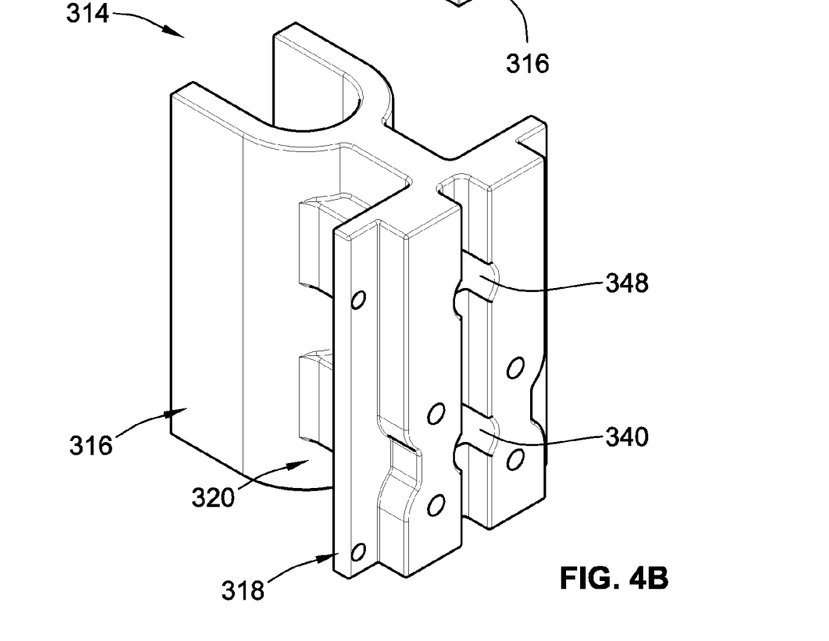
FIG. 4B is an alternative perspective-view illustration of the exemplary power connector of FIG. 4A.

Referring to FIGS. 4A and 4B, wherein similar reference numerals refer to similar components from the other Figures, another exemplary power connector, indicated generally at 314, is presented in accordance with aspects of the present disclosure. Like the power connectors 114 and 214 discussed above, the power connector 314 comprises three primary segments: a fork-shaped head 316, a base 318, and a yoke 320. In the embodiment illustrated in FIGS. 4A and 4B, the head 316, base 318, and yoke 320 are structurally and functionally similar to the head 116, base 118, and yoke 120 of FIGS. 2A-2D. By way of non-limiting example, the yoke 320 extends between and electrically and mechanically connects the base 318 to the fork-shaped head 316. Additionally, the head 316 is configured to electrically connect the power connector 314 to an electrical component, such as the circuit breaker assembly 10 of FIG. 1. As another example of similarity, the base 318 is configured to mount the power connector 314 to a mounting surface, such as a complementary segment of the switchgear assembly 12 of FIG. 1, and operatively couple the power connector 314 to an electrical circuit, which may be by way of a power bus bar. In yet another example, the yoke 320 has a transverse cross-section with an elongated cruciform shape. The yoke 320 can be optimized similar to the yoke 120 to increase thermal dissipativity, reduce the skin effect, the proximity effect, and connector material, while maintaining the requisite current carrying capacity and structural integrity. Consequently, for brevity and conciseness, these components will not be described again in detail.

One difference between the power connector 314 of FIGS. 4A and 4B and the power connectors 114 and 214 is the overall size and weight of the connector 214. In particular, the power connector 214 has a larger height H3 than the height H1 of the power connector 114 and the height H2 of the power connector 214. In some embodiments, the height H1 is approximately 2 inches (5.1 cm), the height H2 is approximately 3 in (7.6 cm), whereas the height H3 is 5 in (12.7 cm). As such, the power connector 314 also has a larger electrical and mechanical load carrying capacity than the power connectors 114 and 214. In addition, the cruciform transverse cross-section of the yoke 320 comprises four laterally extending ribs, two of which are visible in the views provided (designated 342 and 344 in FIG. 4A). The first pair of the ribs 342, 344 project generally perpendicularly from a first side of a column 346, while the second pair (not visible) project generally perpendicularly from a second side of the column 346, which opposes the first side. In addition, the power connector 314 includes a first circular borehole 340 that is vertically spaced from a second circular borehole 348, both of which extend longitudinally through the power connector 314 from the base 316, through the yoke 320, and out the fork-shaped head 318.

FIGS. 5A-5D illustrate a different exemplary power connector, indicated generally at 414, in accordance with aspects of the present disclosure. Similar to the power connectors 114, 214 and 314, the power connector 414 comprises three primary segments: a fork-shaped head 416, a base 418, and a yoke 420. In the illustrated embodiments, the yoke 420 originates at and projects from the surface of the base 418 that is opposite the surface which contacts the backmold 30; the yoke 420 terminating at and connecting to the web of the fork-shaped head 416. The head 416 and the base 418 of the embodiment presented in FIGS. 5A-5D are structurally and functionally similar to the head 116 and base 118 of FIGS. 2A-2D. To that end, unless explicitly indicated otherwise, the power connector 414 can include any of the features and options discussed above or below. Consequently, only key points of possible distinction are developed in further detail below.

Figure 5A:
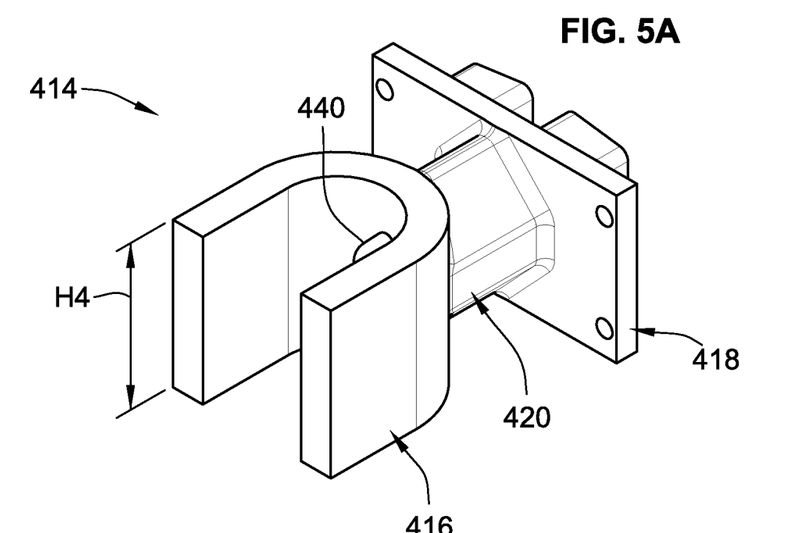
FIG. 5A is a perspective-view illustration of an exemplary hexagonal power connector in accordance with aspects of the present disclosure.
Figure 5B:
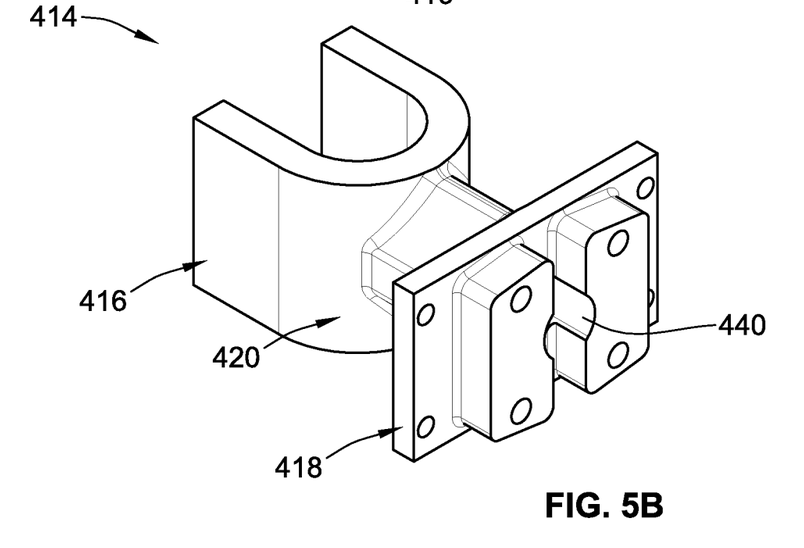
FIG. 5B is an alternative perspective-view illustration of the exemplary power connector of FIG. 5A.
Figure 5C:
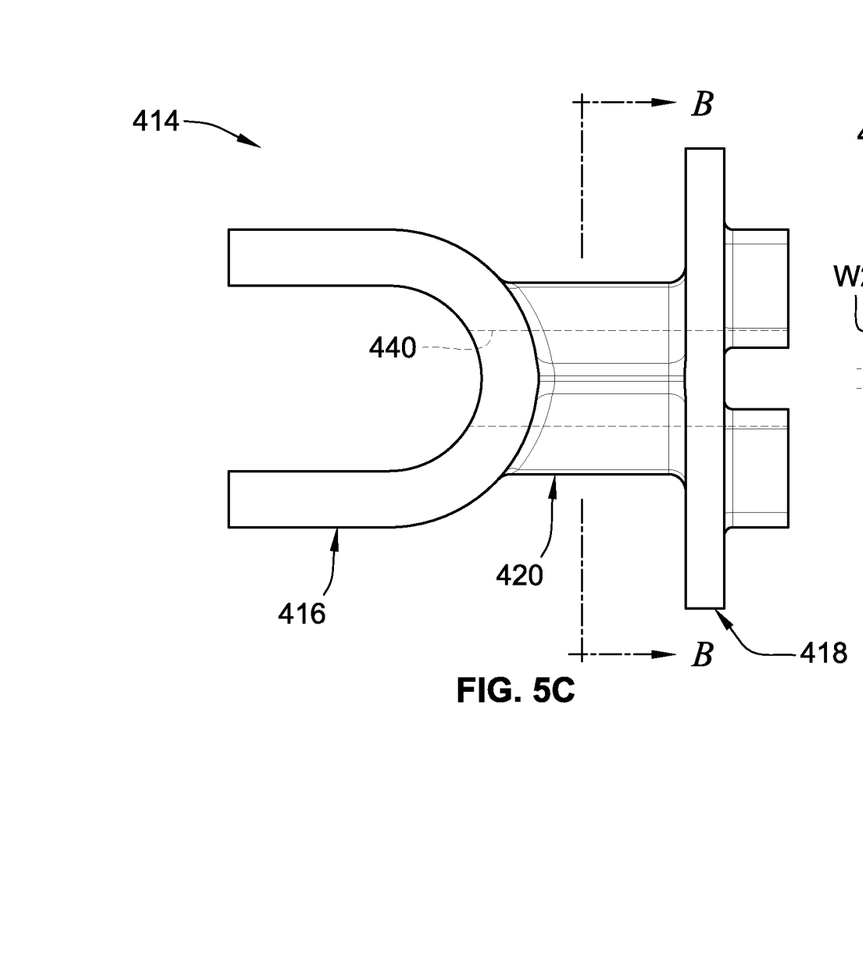
FIG. 5C is a plan-view illustration of the exemplary power connector of FIG. 5A.
Figure 5D:
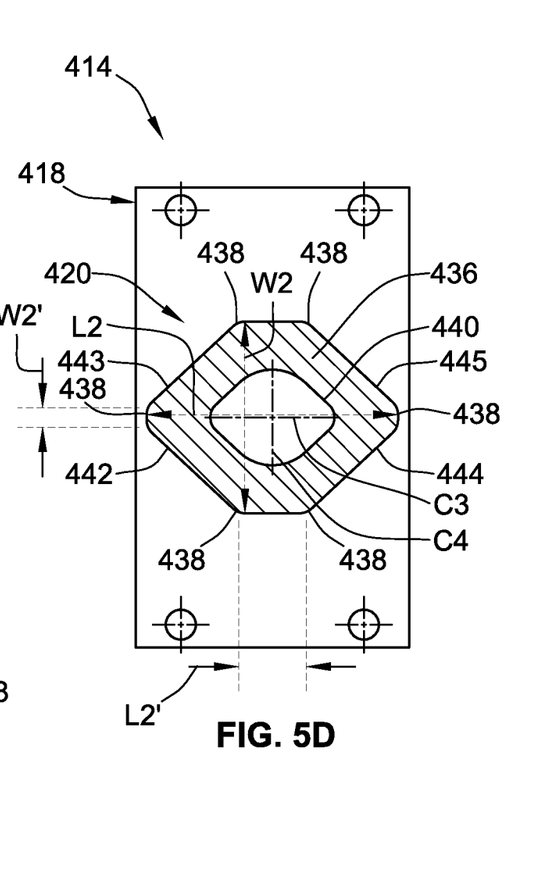
FIG. 5D is an end-view illustration of the exemplary power connector of FIG. 5A, which is taken in partial cross-section along line B-B of FIG. 5C.

FIG. 5D shows that the yoke 420 has a transverse cross-section, designated generally at 436, with an elongated hexagonal shape comprising six substantially flat sides. The transverse cross-section 436 is generally perpendicular to the longitudinal center axis of the power connector 414, which is represented by the center of the crosshair provided in FIG. 5D. An optional oblong-shaped borehole 440 extends longitudinally through the power connector 414 from the base 418, through the yoke 420, and out the fork-shaped head 416. Unlike some conventional connectors, the yoke 420 of the power connector 414 can have a complex 3-dimensional geometry. In some embodiments of the present disclosure, for example, the geometric configuration of the yoke 420 changes in all three planes of a Cartesian coordinate system.

In contrast to prior designs, the length L2 of the transverse cross-section 436 of the yoke 420 in FIGS. 5A-5D is not constant along its width W2, and the width W2 of the transverse cross-section 436 is not constant along its length L2. According to the illustrated embodiment, the length L2 decreases, for example, to L2' as you move from the longitudinally oriented center line C3 of FIG. 5D toward either respective lateral end (or side) of the transverse cross-section 436. In a similar regard, the width W2 of the transverse cross-section 436 decreases, for example, to W2' as you move from the laterally oriented center line C4 of FIG. 5D toward either longitudinal end (or side) of the transverse cross-section 436. Thus, the length L2 or the width W2, or both as illustrated herein, are varying between their respective ends of the transverse cross-section.

As seen in the cross-section illustration presented in FIG. 5D, the outer periphery of the transverse cross-section 436 has a plurality of sides 442-445, each of which tapers as you move from either center line C3, C4 towards the respective ends of the transverse cross-section 436. In addition, the outer periphery of the transverse cross-section 436 of the yoke 420 includes a plurality of round-chamfered corners 438 (six in the illustrated embodiment). Analogous to the embodiments presented in the other Figures, the yoke 420 of FIGS. 5A-5D is optimized to increase thermal dissipativity, reduce the skin effect, the proximity effect, and connector material, while maintaining the requisite current carrying capacity and structural integrity.

Figure 6A:
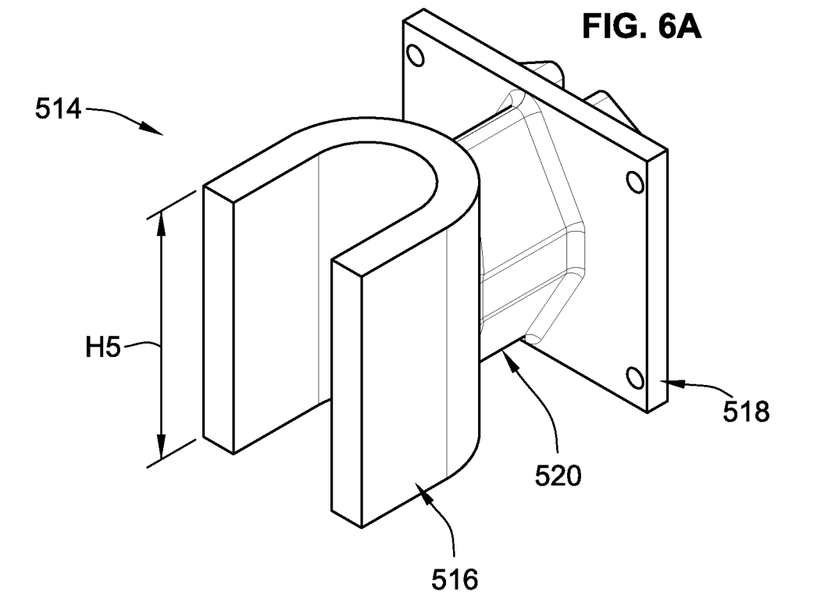
FIG. 6A is a perspective-view illustration of another exemplary hexagonal power connector in accordance with aspects of the present disclosure.
Figure 6B:
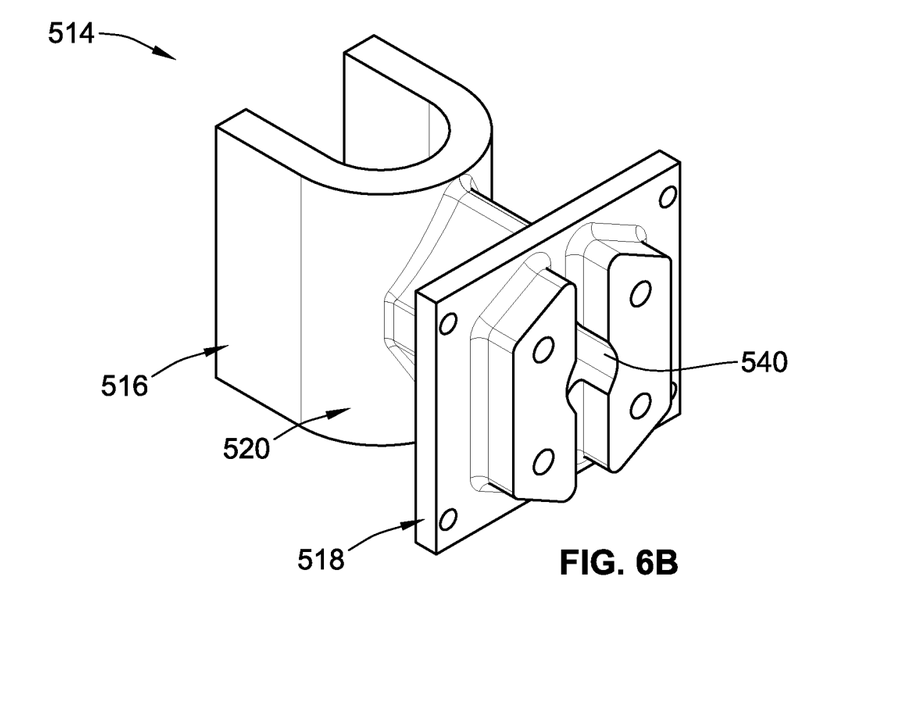
FIG. 6B is an alternative perspective-view illustration of the exemplary power connector of FIG. 6A.

Referring to FIGS. 6A and 6B, wherein similar reference numerals refer to similar components from the other Figures, another exemplary power connector, indicated generally at 514, is presented in accordance with aspects of the present disclosure. Similar to the various power connector embodiments discussed above, the power connector 514 comprises three primary segments: a fork-shaped head 516, a base 518, and a yoke 520. In the embodiment illustrated in FIGS. 6A and 6B, the head 516, base 518, and yoke 520 are structurally and functionally similar to the head 416, base 418, and yoke 420 of FIGS. 5A-5D. By way of non-limiting example, the yoke 520 extends between and electrically and mechanically connects the base 518 to the head 516. Additionally, the fork-shaped head 516 is configured to electrically connect the power connector 514 to an electrical component, such as the circuit breaker assembly 10 of FIG. 1. As another example of similarity, the base 518 is configured to mount the power connector 514 to a mounting surface, such as a complementary segment of the switchgear assembly 12 of FIG. 1, and operatively couple the power connector 514 to an electrical circuit, which may be by way of a power bus bar. In yet another example, the yoke 520 has a transverse cross-section with an elongated hexagonal shape comprising six substantially flat sides. The yoke 520 can be configured and otherwise optimized similar to the yoke 420 to increase thermal dissipativity, reduce the skin effect, the proximity effect, and connector material, while maintaining the requisite current carrying capacity and structural integrity. Consequently, for brevity and conciseness, these components will not be described again in detail.

A primary difference between the power connector 514 of FIGS. 6A and 6B and the power connector 414 is the overall size and weight of the connector 514. In particular, the power connector 514 has a larger height H5 than the height H4 of the power connector 414. In some embodiments, the height H4 is approximately 2 inches (5.1 cm), whereas the height H5 is approximately 3 in (7.6 cm). As such, the power connector 514 also has a larger electrical and mechanical load carrying capacity than the power connector 414.

Turning then to FIGS. 7A-7D, an additional exemplary power connector, indicated generally at 614, in presented accordance with additional aspects of the present disclosure. Similar to aforementioned power connectors 114, 214, 314, 414 and 514, the power connector 614 comprises three primary segments: a fork-shaped head 616, a base 618, and a yoke 620. In the illustrated embodiments, the yoke 620 originates at and projects from the surface of the base 618 that is opposite the surface which contacts the backmold 30; the yoke 620 terminating at and connecting to the web of the fork-shaped head 616. The head 616 and the base 618 of the embodiment presented in FIGS. 7A-7D are structurally and functionally similar to the head 116 and base 118 of FIGS. 2A-2D. To that end, unless explicitly indicated otherwise, the power connector 614 can include any of the features and options discussed above or below. Consequently, only key points of distinction are described in detail hereinbelow.

Figure 7A:
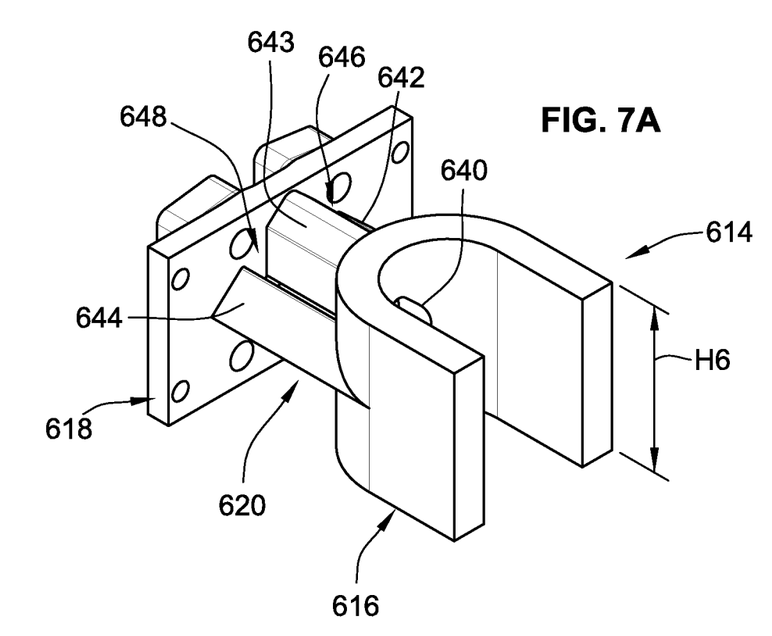
FIG. 7A is a perspective-view illustration of an exemplary vented-diamond power connector in accordance with aspects of the present disclosure.
Figure 7B:
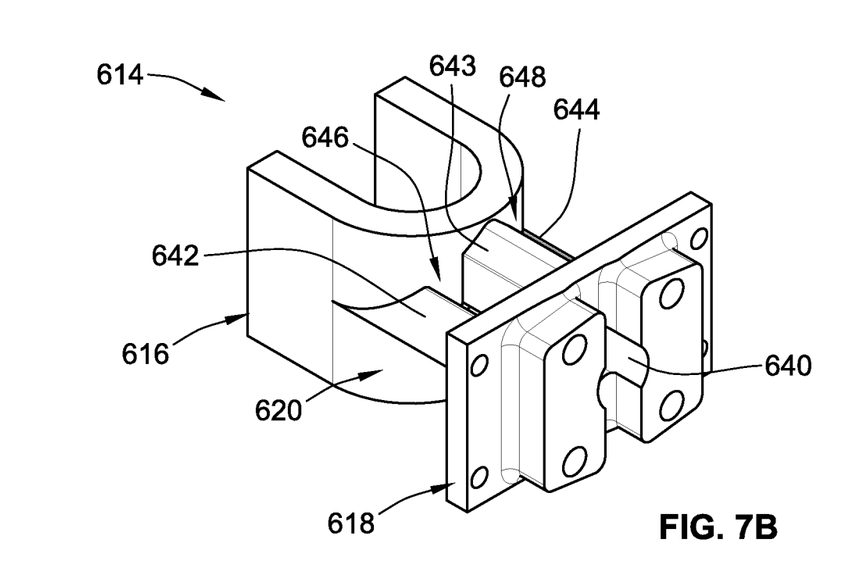
FIG. 7B is an alternative perspective-view illustration of the exemplary power connector of FIG. 7A.
Figure 7C:
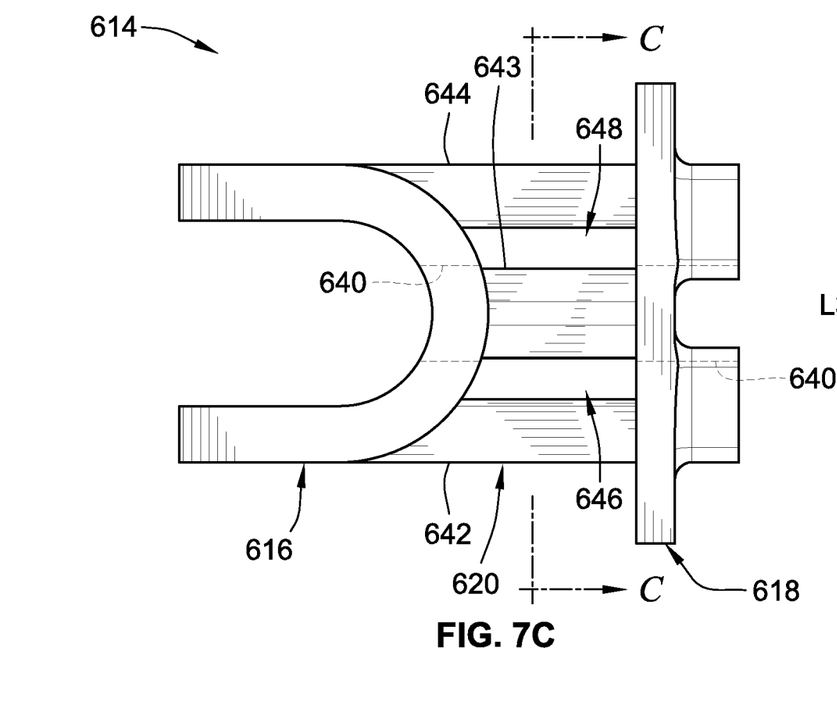
FIG. 7C is a plan-view illustration of the exemplary power connector of FIG. 7A.
Figure 7D:
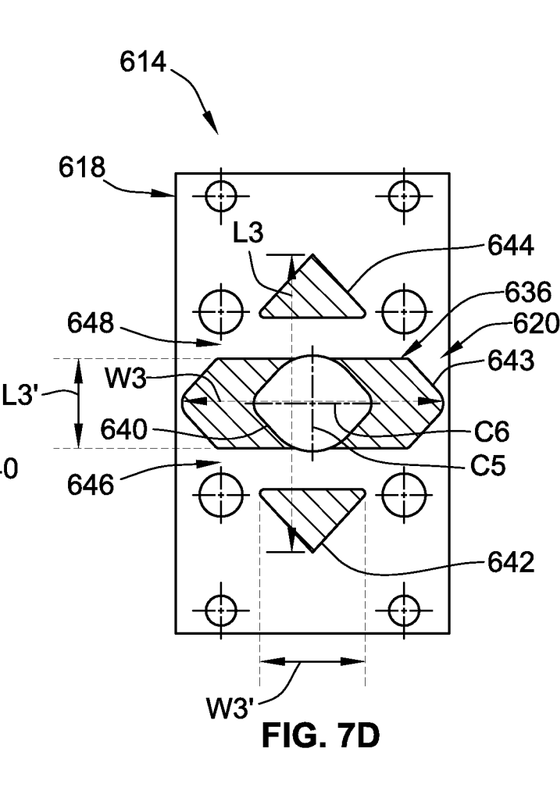
FIG. 7D is an end-view illustration of the exemplary power connector of FIG. 7A, which is taken in partial cross-section along line C-C of FIG. 7C.

The yoke 620 of the power connector 614 is shown in FIG. 7D with a transverse cross-section, designated generally at 636, with a diamond (also referred to herein as "vented-diamond") shape. The transverse cross-section 636 is generally perpendicular to the longitudinal center axis of the power connector 614, which is represented by the center of the crosshair provided in FIG. 6D. In contrast to the embodiments discussed above and below, the major axis of the elongated transverse cross-section 636 (i.e., the axis with the greatest distance between antipodal points) is generally parallel to the major axis of the base 618. Another point of distinction is that the elongated transverse cross-section of the yoke 618 comprises three distinct cross-sectional areas 642-644. These distinct cross-sectional areas 642-644 are created, at least in part, because the yoke 620 defines one or more, and in some embodiments at least two venting slots 646 and 648, each of which extends transversely through the yoke 620. In non-limiting examples, the first and third cross-sectional areas 642 and 644 are shown in FIG. 7D with a common triangular shape and each positioned on a respective opposing side of the second cross-sectional area 643, which has a hexagonal shape. These venting slots 646, 648 provide increased convective thermal dissipation over the other embodiments disclosed herein, without compromising structural integrity.

In contrast to prior designs, the length L3 of the transverse cross-section 636 of the yoke 620 in FIGS. 7A-7D is not constant along its width W3, and the width W3 of the transverse cross-section 636 is not constant along its length L3. According to the illustrated embodiment, the length L3 decreases, for example, to L3' as you move from the longitudinally oriented center line C5 of FIG. 7D toward either lateral end (or side) of the transverse cross-section 636. In a similar regard, the width W3 of the transverse cross-section 636 decreases, for example, to W3' as you move from the laterally oriented center line C6 of FIG. 7D toward either longitudinal end (or side) of the transverse cross-section 636. Thus, the length L3 or the width W3, or both as illustrated herein, are varying between their respective ends of the transverse cross-section.

An optional oblong-shaped borehole 640 extends longitudinally through the power connector 614 from the base 618, through the yoke 620, and out the fork-shaped head 616. Unlike some conventional connectors, the yoke 620 of the power connector 614 can have a complex 3-dimensional geometry. In some embodiments of the present disclosure, for example, the geometric configuration of the yoke 620 changes in all three planes of a Cartesian coordinate system. Analogous to the embodiments presented in the other Figures, the yoke 620 of FIGS. 7A-7D is optimized to increase thermal dissipativity, reduce the skin effect, the proximity effect, and connector material, while maintaining the requisite current carrying capacity and structural integrity.

Figure 8A:
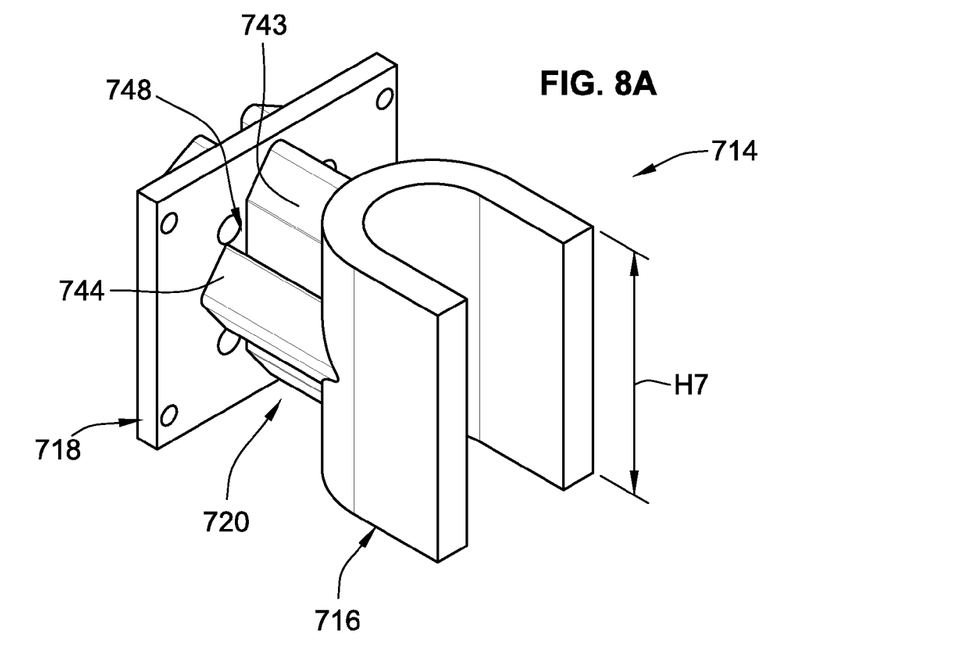
FIG. 8A is a perspective-view illustration of another exemplary vented-diamond power connector in accordance with aspects of the present disclosure.
Figure 8B:
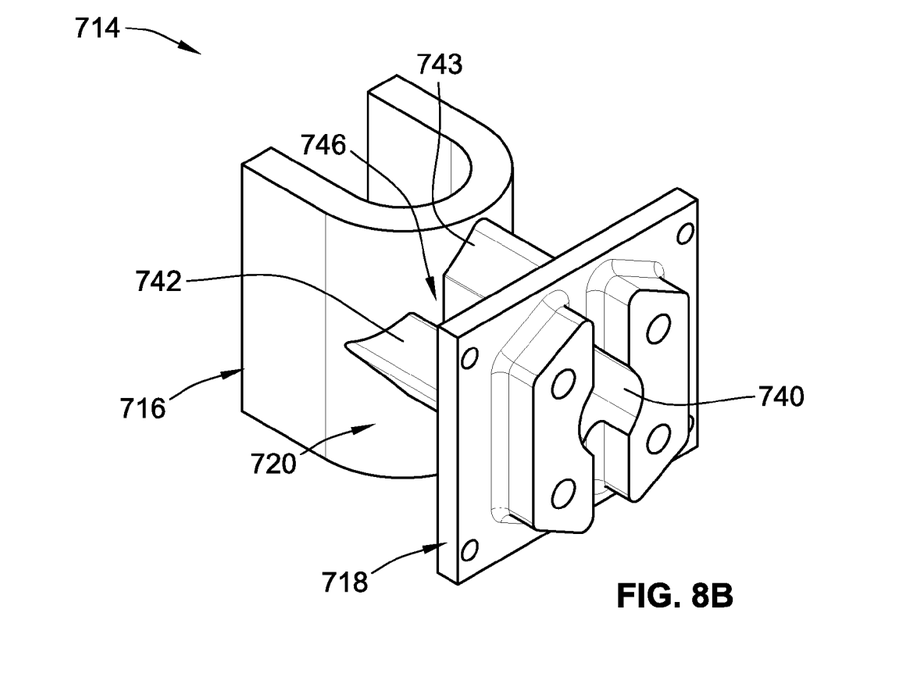
FIG. 8B is an alternative perspective-view illustration of the exemplary power connector of FIG. 8A.

Referring to FIGS. 8A and 8B, wherein similar reference numerals refer to similar components from the other Figures, another exemplary power connector, indicated generally at 714, is presented in accordance with aspects of the present disclosure. Similar to the various power connector embodiments discussed above, the power connector 714 comprises three primary segments: a fork-shaped head 716, a base 718, and a yoke 720. In the embodiment illustrated in FIGS. 8A and 8B, the head 716, base 718, and yoke 720 are structurally and functionally similar to the head 616, base 618, and yoke 620 of FIGS. 7A-7D. By way of non-limiting example, the yoke 720 extends between and electrically and mechanically connects the base 718 to the head 716. Additionally, the fork-shaped head 716 is configured to electrically connect the power connector 714 to an electrical component, such as the circuit breaker assembly 10 of FIG. 1. As another example of similarity, the base 718 is configured to mount the power connector 714 to a mounting surface, such as a complementary segment of the switchgear assembly 12 of FIG. 1, and operatively couple the power connector 714 to an electrical circuit, which may be by way of a power bus bar. In yet another example, the yoke 720 has an elongated transverse cross-section, which has a diamond or "vented-diamond" shape comprising four substantially flat peripheral sides and a pair of generally parallel venting slots (only one of which is partially visible in the drawings and designated 746 in FIG. 8B). The yoke 720 can be configured and otherwise optimized similar to the yoke 620 to increase thermal dissipativity, reduce the skin effect, the proximity effect, and connector material, while maintaining the requisite current carrying capacity and structural integrity. Consequently, for brevity and conciseness, these components will not be described again in detail.

A primary difference between the power connector 714 of FIGS. 8A and 8B and the power connector 614 is the overall size and weight of the power connector 714. In particular, the power connector 714 has a larger height H7 than the height H6 of the power connector 614. In some embodiments, the height H7 is approximately 2 inches (5.1 cm), whereas the height H6 is approximately 3 in (7.6 cm). As such, the power connector 714 also has a larger electrical and mechanical load carrying capacity than the power connector 614.

While particular aspects, embodiments, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the invention as defined in the appended claims. Lastly, all of the patent and non-patent literature discussed above is incorporated herein by reference.

What is claimed is:

1. A power connector for connecting a circuit breaker to an electrically conductive bus bar, the power connector comprising:
    a fork-shaped head configured to electrically connect to the circuit breaker;
    a base configured to electrically connect to the bus bar; and
    a yoke extending between and electrically connecting the base to the fork-shaped head, the yoke having a transverse cross-section with a length greater than a width, wherein both the length and the width vary between respective ends of the transverse cross-section.

2. The power connector of claim 1, wherein a center of the transverse cross-section of the yoke has a first width and a first length, one end of the transverse cross-section has a second width, and another end of the transverse cross-section has a second length, the first width being greater than the second width and the first length being greater than the second length.

3. The power connector of claim 1, wherein both the length and the width decrease from the center towards the respective ends of the transverse cross-section.

4. The power connector of claim 1, wherein an outer periphery of the transverse cross-section of the yoke includes a plurality of chamfered corners.

5. The power connector of claim 1, wherein the transverse cross-section has an outer periphery with a plurality of sides, each of the sides of the outer periphery tapering towards the respective ends of the transverse cross-section.

6. The power connector of claim 1, wherein the base, the yoke, and the fork-shaped head collectively define a borehole extending therethrough.

7. The power connector of claim 1, wherein the transverse cross-section has a cruciform shape.

8. The power connector of claim 1, wherein the transverse cross-section has a hexagonal shape.

9. The power connector of claim 1, wherein the transverse cross-section has a diamond shape.

10. The power connector of claim 1, wherein the transverse cross-section comprises a plurality of distinct cross-sectional areas.

11. The power connector of claim 1, wherein the yoke defines one or more venting slots extending laterally therethrough.

12. The power connector of claim 1, wherein the fork-shaped head includes two or more prongs, each of the prongs being configured to receive thereon one or more breaker clusters protruding from the circuit breaker.

13. The power connector of claim 1, wherein the fork-shaped head includes two or more prongs connected by a web, the web and the two or more prongs having a generally uniform thickness.

14. The power connector of claim 1, wherein the base includes a first mounting surface generally parallel to and spaced from a second mounting surface, the first mounting surface being configured to attach to a turnable joint coupling connected to the bus bar, and the second mounting surface being configured to attach to a backmold connected to a switchgear assembly.

15. The power connector of claim 1, wherein the base, the head, and the yoke are integrally formed as a metallic single-piece structure.

16. The power connector of claim 1, wherein the transverse cross-section is substantially perpendicular to a centrally located major axis of the power connector.

17. The power connector of claim 1, wherein the length and the width cooperatively define the outer periphery of the transverse cross-section.

18. A power connector for electrically coupling a circuit breaker to an electrically conductive bus bar of a switchgear assembly, the circuit breaker having a plurality of breaker clusters protruding therefrom, the power connector comprising:
- a fork-shaped head with two or more prongs, each of the prongs being configured to receive thereon and electrically connect to one or more of the breaker clusters;
- a base configured to mount to the switchgear assembly and electrically connect to the bus bar; and
- a yoke extending between and integrally formed with the base and the fork-shaped head, the yoke having a transverse cross-section with an elongated geometry having a length greater than a width, the transverse cross-section being substantially perpendicular to a centrally located major axis of the power connector, the length and the width decreasing from the center towards respective ends of the transverse cross-section.

19. A switchgear assembly for electrically coupling a circuit breaker to an electrically conductive power bus bar, the circuit breaker having a plurality of breaker clusters protruding therefrom, the switch gear assembly comprising:
- a housing configured to receive therein the circuit breaker;
- a backmold operatively attached at a distal end of the housing; and
- an electrical connector including a metallic monolithic body with a fork-shaped head configured to electrically connect to the circuit breaker, a base configured to mount to the backmold and electrically connect to the bus bar, and a yoke extending between the base and the fork-shaped head, the yoke having a transverse cross-section with a length and a width, the transverse cross-section being substantially perpendicular to a major axis of the electrical connector, the length and the width varying between respective ends of the transverse cross-section.

* * * * *